United States Patent

Leuschner et al.

[15] 3,678,648
[45] July 25, 1972

[54] APPARATUS FOR THE PRODUCTION OF A VACUUM PACKAGE

[72] Inventors: Gerhard Leuschner, Ottendorf-Okrilla; Peter Pietsch; Gunter Kadner, both of Dresden, all of Germany

[73] Assignee: Veb Kombinat Nagema, Dresden, Germany

[22] Filed: Jan. 14, 1971

[21] Appl. No.: 106,461

[52] U.S. Cl. .......................................................53/112 A
[51] Int. Cl..............................................................B65b 31/02
[58] Field of Search.........................................53/22 A, 112 A

[56] References Cited

UNITED STATES PATENTS 2,888,787   6/1959   Cloud.................................53/112 A X
2,935,828   5/1960   Mahaffy et al......................53/112 A Primary Examiner—Travis S. McGehee
Attorney—Nolte and Nolte

[57] ABSTRACT

In an apparatus for the production of vacuum packages, comprising a drum having serially arranged mold cavities on its surface, is provided a cover means extending over at least two serially arranged mold cavities.

5 Claims, 5 Drawing Figures

Patented July 25, 1972 3,678,648

INVENTORS
GERHARD LEUSCHNER
PETER PIETSCH
GÜNTHER KADNER

BY Nolte & Nolte

ATTORNEYS

Patented July 25, 1972
3,678,648
2 Sheets-Sheet 2
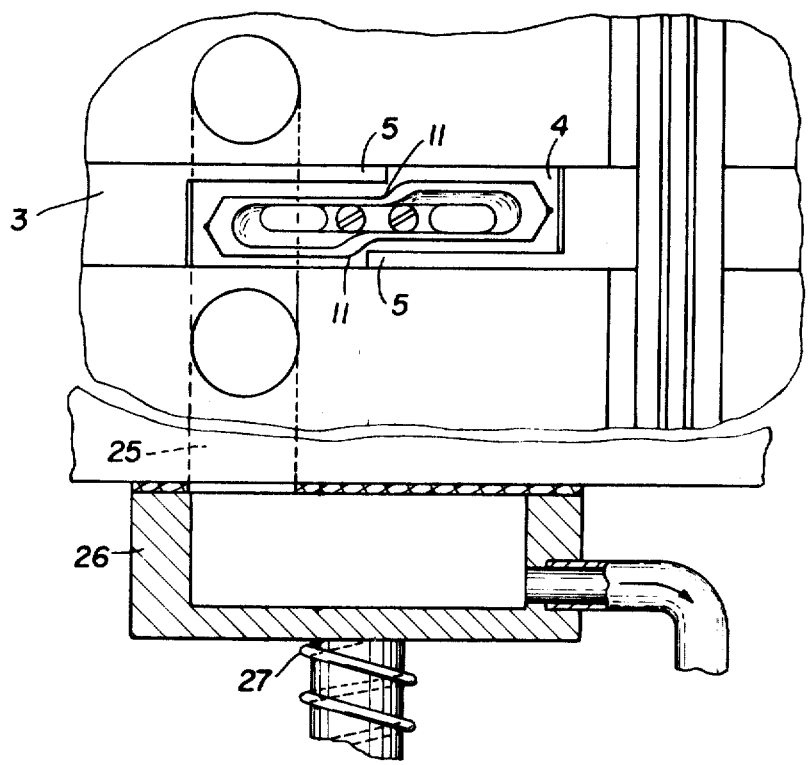
FIG. 4
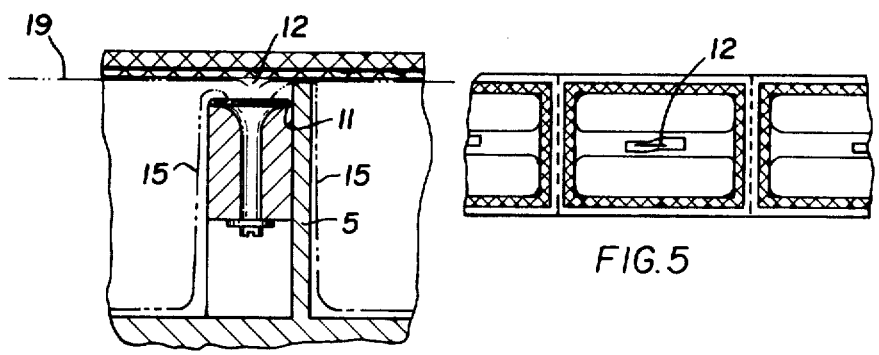
FIG. 3
FIG. 5
INVENTORS
GERHARD LEUSCHNER
PETER PIETSCH
GÜNTHER KADNER
BY *Nolte & Nolte*
ATTORNEYS

APPARATUS FOR THE PRODUCTION OF A VACUUM PACKAGE

The invention relates to an apparatus for the production of vacuum packages.

Apparatuses for the production of vacuum packages are already known. In one of these known machines a sheet is conducted over guide rollers, about a drum which is provided with vacuum mold cavities and the sheet is applied onto the drum. Two ropes, which are likewise wound around the drum, clamp the sheet on the drum edges. The center of the drum is connected to a vacuum station, and ducts extend from the drum center to the various vacuum mold cavities. The attached sheet is heated by heating elements arranged over a part of the circumference of the drum and pulled into the vacuum mold cavities when the air is exhausted from the latter. By subsequent removal of the sheet from the drum and cutting of the sheet are formed individual sheets, each having a vacuum molded recess. This arrangement does not permit, however, the application of a top sheet on the individual vacuum molded sheets. For this purpose, an additional device is required (D.B.R. Auslegeschrift No. 1,118,444).

A prior art apparatus for vacuum molding recesses in a sheet and applying a top sheet onto the vacuum molded sheet is so designed that vacuum molds are arranged on a conveyor chain on which the bottom sheet is applied, preheated and vacuum molded. The vacuum molded recesses are filled with the articles or materials being packaged and a top sheet is applied onto the vacuum molded sheet and the sheets are covered by means of a bell jar and sealed to each other. A plunger supports the top sheet through an opening provided in the bottom sheet. Air is exhausted from the package through the bored plunger. To prevent the top sheet from being pulled into the depression, the bell jar is evacuated at the same time so that the same pressure is in the package and on the outside. After the evacuation and after a sealing operation in the range of the opening, the bell jar is lifted and the chain is moved on. This arrangement only permits an intermittent operation which limits the output. The vacuum plant must be very powerful, since the package and the bell jar must be evacuated in a short time (D.B.R. Auslegeschrift No. 1,229,897).

Another prior art apparatus is designed as follows. A drum has mold cavities arranged on the circumference of the drum. A sheet is applied on the drum and held at the drum edges. The sheet is heated by means of heating elements, after which the sheet is vacuum molded by exhausting air from the mold cavities. The vacuum molded sheet passes underneath a vacuum chamber after the recesses in the sheet have been filled with material or articles being packaged. The vacuum chamber is so designed that an acute angle formed by two chamber walls is formed at the vacuum chamber outlet. This part of the vacuum chamber is provided with openings. The top sheet passing by the vacuum chamber outlet is pressed from the filled sheet recesses onto the bottom sheet after the air has been evacuated. Behind the suction chamber is arranged a sealing roll which seals the two sheets. This machine is suitable for continuous operation. But due to the fact that the evacuation is effected before the sealing, the top sheet is pulled into the pockets of the bottom sheet. This leads to wrinkling, resulting in an unreliable sealing of the package (D.B.R. Auslegeschrift No. 1,909,404).

It has also been suggested to cover a bottom sheet applied on a drum with a cover die provided with bores, to hold the bottom sheet, to mold the recesses by evacuating the air, to transfer the premolded sheet to a straight belt, to fill the recesses there with the article or material being packaged, to seal on the top sheet at another station behind the filled bottom sheet, to evacuate the packages and to cut the continuous strip of packages into individual packages. This machine is of complicated construction and considerable size (U.S. Pat. No. 2,982,076).

Among the objects of the invention are to increase the working speed of vacuum packaging apparatus, to reduce the output of the vacuum pump relative to the working speed of the packaging apparatus, and to prevent wrinkling during the application of a top sheet on a vacuum molded bottom sheet.

According to the invention, an apparatus is provided for the production of vacuum packages in which the edges of the vacuum molded bottom sheet and of the top sheet are sealed to each other before they are covered against the atmosphere and before the evacuation, and in which the space to be evacuated is reduced to the size of the recesses in the bottom sheet.

More particularly, a constantly revolving means covering at least two of the mold cavities is provided, and, in the direction of motion of a top sheet, a guide element is arranged in front of the covering means and a sealing roll, the sealing roll itself being located in front of the covering means, in such a way that the top sheet can be fed and sealed in the direction of the tangential plane through the contact line located on the connecting plane of the axes of sealing roll and drum, the contact line being defined by a nip formed by the sealing roll and the drum.

The cover element is preferably a pliable endless belt which is impermeable to air and which is provided with a fabric insert and in which are incorporated rigid supporting elements transverse to the direction of motion. It is also possible to use as the cover means endless roller chains, provided with cover plates.

In order to assure the feed of the sheet to the contact line and to use little space, it is preferred that the guide means comprise an adjustably mounted angulated plate.

The arrangement of the invention has the advantage that the top sheet cannot sink into the mold cavities of the drum since it is sealed directly onto the bottom sheet as soon as it comes in contact with the drum. Wrinkling is thus impossible. Since the top sheet also comes at this point for the first time into contact with the sealing roll, undesired distortion of the sheet by heat action is likewise impossible.

Due to the arrangement of a constantly revolving cover means and due to the fact that, according to the invention, the edges of the packages are already completely closed before the start of the evacuation, it is possible to reduce the space to be evacuated to the size of the recesses molded in the bottom sheet. It is thus possible to use a vacuum pump which has a substantially lower output for a working speed of the apparatus comparable with the prior art.

The invention will now be described by reference to a specific embodiment, as illustrated in the drawings, in which:

FIG. 3 is a section taken on line A—A of FIG. 2;

FIG. 4 is a partial plan view, in partial section, of the apparatus of FIG. 2; and FIG. 5 is a schematic plan view of the sealing of the two-unit packages after the evacuation.

Figure 1:
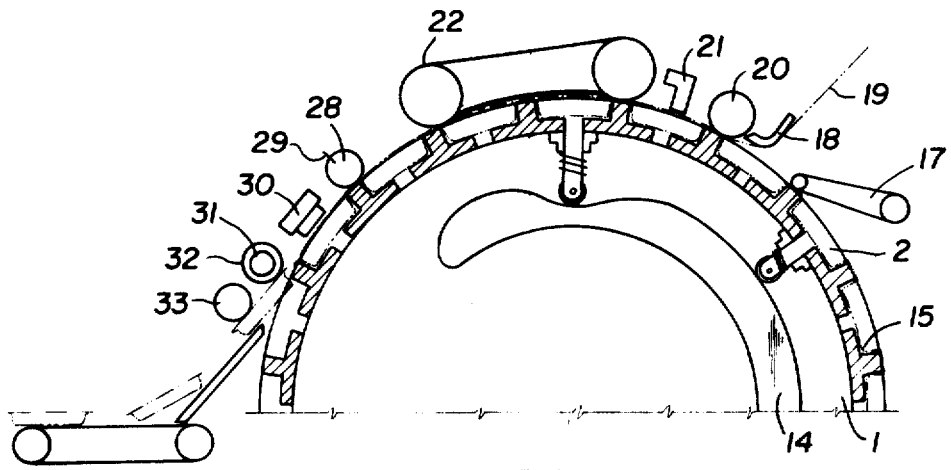
FIG. 1 is a partial side elevation, in partial section.
Figure 2:
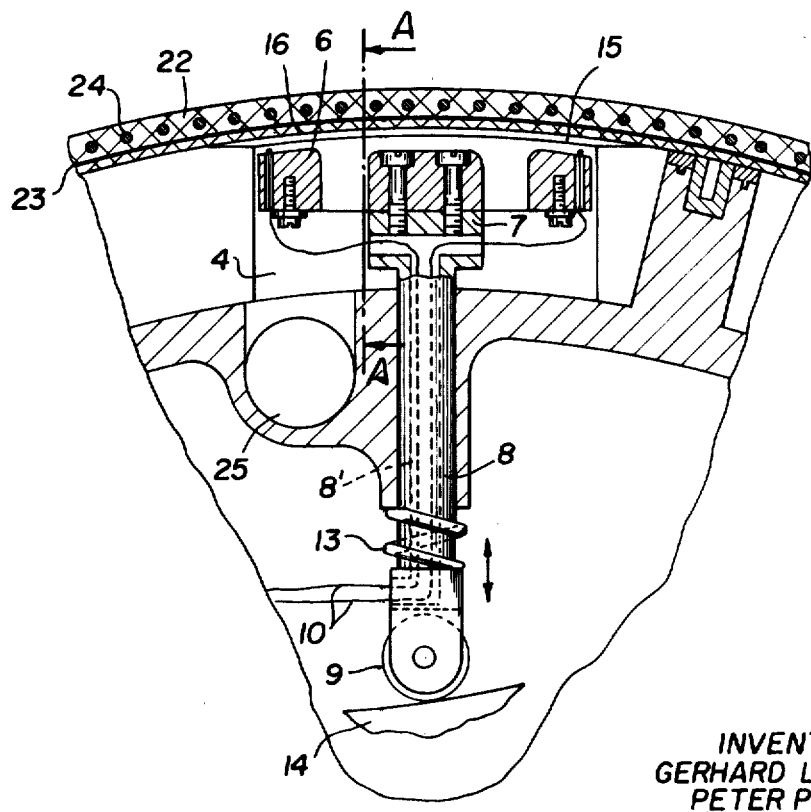
FIG. 2 is a detail of the construction of FIG. 1.

The illustrated apparatus comprises a continuously rotating drum (FIG. 1). The drum 1 is provided on its circumference with two parallel sets of mold cavities 2. A center web 3 separating each parallel pair of mold cavities 2 is interrupted approximately in the center by a recess 4. The recess 4 is so designed that two diagonally opposed supporting webs 5 are provided which extend approximately to the center of the recess 4. The recess 4 is occupied by the upper portion 6 of a hollow plunger 7. The hollow plunger 7 comprises a guide piece 8 with a guide roller 9 at the bottom end and is bored in its longitudinal direction. Through the bore 8' extend wires 10 (FIG. 2) for a sealing loop 11 (FIG. 4). The sealing loop 11 is mounted on the upper portion 6 of the hollow plunger 7 and serves to seal the edges of a slot 12 provided in the sheets after the evacuation of the package (FIG. 3). On the bottom portion of the hollow plunger 7 is arranged a spring 13 which presses the hollow plunger against a cam segment 14.

After the bottom sheet 15 (FIG. 2) has been applied on drum 1, it is clamped on the drum edges by known means (not illustrated). The bottom sheet 15 is heated by heating elements provided in the drum 1. Then it is deep-drawn by exhausting the air in the mold cavities 2. During the deep drawing, the hollow plunger 7 is guided by the cam segment 14 by a small amount toward the drum center. In this way a troughshaped depression 16 (FIG. 2) is obtained in the area of the recess 4 of the center web 3. This depression 16 permits evacuation of the air from the mold cavities during the subsequent evacuation of the double package sealed at the edges (FIG. 5).

After parallel sets of recesses have been formed in the bottom sheet 15 by the above mentioned deep drawing (vacuum molding) process, the material or articles being packaged are charged into the recesses by the transfer belt 17 (FIG. 1). The top sheet 19 is fed under the angular inlet guide plate 18. The inlet plate 18 is so arranged directly in front of sealing roll 20 that the top sheet 19 is sealed to the bottom sheet 15 as soon as it comes in contact with the bottom sheet 15. The sealing roll is so designed according to known constructions that only the edges of the double (i.e., having top and bottom) package (FIG. 5) are sealed. After the sealing of the bottom and top sheet, a slot 12 is cut in the bottom and top sheet by a periodically actuated cutter 21, in the area of the recess 4 of the center web 3, i.e., where the bottom and top sheet are in contact and still not sealed. Adjoining the cutter 21 is arranged a cover belt 22 constantly rotating with the drum 1. The cover belt 22 is comprised of rubber and is provided with a fabric insert 23. Transverse to the direction of motion of the belt 22 are incorporated steel rods 24 which impart to the belt 22 a corresponding transverse rigidity, so that sinking of the belt 22 into the mold cavities 2 is prevented. In the center of the drum 1, the cover belt 22 bears on the center web 3. In the area of the recess 4 the cover belt 22 is held by the supporting webs 5. Due to this design it is possible to use a relatively weak belt. The width of the cover belt 22 corresponds to the width of the drum 1 and covers two mold cavities 2. When the sealed sheets have run under the cover belt 22, due to the rotation of the drum 1, and are completely sealed by the belt 22 from the atmosphere in the zone of the cavities, the hollow plunger 7 is guided into its bottom position by the cam segment 14. At the same time duct 25 in the drum 1 provided for the evacuation is connected with the vacuum plant (not illustrated) through the connecting chamber 26. The same type of evacuation control is also provided during the vacuum molding. The two connecting chambers 26 are covered with a polytetrafluoroethylene coating. They are stationary and each is pressed by a respective compression spring 27 against a slip ring (not illustrated) arranged on the drum 1. Due to the constant rotation of the drum 1, the duct 25 is alternately connected to and disconnected from the vacuum plant. When the vacuum plant is connected through the connecting chamber 26 to the duct 25, the air contained in the packaging pockets is evacuated coincidentally in two packaging pockets through the slot 12.

Approximately in the last third of the cover zone, the hollow plunger 7 is again guided upward, whereupon the sealing loop 11 bears tightly on the sheet thereby to actuate a switch to cause current to pass through the sealing loop 11, so that the sealing loop 11 is heated and the sheets are sealed in the circumferential area of the slot 12. Shortly before the packaging strand leaves the cover zone, the duct 25 is opened. The incoming atmospheric air presses the bottom sheet 15 against the top sheet 19 and the cover belt 22. Sinking of the top sheet 19 into the molded cavities 2 is thus impossible when the packaging strand leaves the cover belt.

After the cover belt 22 is arranged a cross cutting machine. The cross cutting machine consists of a roll 28 in the axial direction of which is arranged a cutter 29. The circumferential speed of the roll 28 is adjustable and can thus be regulated to different package lengths. The cutter 29 is provided at the ends and in the center with a narrow recess so that the packaging strand is not completely severed in its transverse direction and can later be easily removed from the drum 1. The still unsealed points in the area of the center web of the packaging strand are sealed completely by two longitudinal welding stirrups 30 which are slightly spaced from each other. The separation of the packaging strand in longitudinal direction and the completion of the transverse separating is effected over two rollers or pairs of rollers arranged in series. The first roller 31 is provided in the center with a circular blade 32 which cuts the packaging strand in longitudinal direction. This roller rotates at the same speed as the drum 1. The second roller 33 rotates at a higher speed and performs an oscillating movement between a position bearing against the packaging strand and a position spaced from the packaging strand. Due to the higher speed of the roller 33 relative to the packaging strand, an incompletely severed package is torn off when the roller 33 bears on the package and the thus completely severed package is transferred to a sledge plate from which the package slides on a conveyor belt.

While the invention has been described with reference to a specific embodiment, it is to be understood that such description is by way of illustration and is not intended to limit the scope of the invention as defined by the appended claims.

What is claimed is:

1. Apparatus for the production of vacuum packages comprising a molding drum, a plurality of mold cavities serially and transversely arranged on the circumference of the drum, means for holding a first plastic sheet in contact with the circumference of the drum, means for heating the sheet while the sheet is held on the drum, means for evacuating the mold cavities while the sheet is held on the drum and heated thereby to form in the sheet recesses corresponding to the mold cavities, means for guiding a second plastic sheet into contact with the thus formed first sheet on the drum, a sealing drum positioned so as to define with the molding drum a nip for receiving the second plastic sheet from the guiding means, said sealing drum being provided with means for sealing together the first and second sheets around the periphery of a pair of said transverse mold cavities, means for forming an aperture in the sealed first and second sheets between the pair of mold cavities, means for covering the apertured first and second sheets over a circumferential portion of the molding drum corresponding to at least two of the serially arranged mold cavities, means for evacuating the space between the first and second sheets in the mold cavities beneath the covering means, means for sealing the apertures while the first and second sheets are still covered by the covering means and means for opening the bottom of each mold cavity to the atmosphere after the slits of the sheets therein have been sealed and the sheets are about to pass from under the covering means.

2. Apparatus according to claim 1, in which the cover means comprises an endless pliable belt impervious to the atmosphere.

3. Apparatus according to claim 2, in which the belt comprises fabric with a layer of rubber on each face and transverse rigid rods embedded in at least one of the layers of rubber.

4. Apparatus according to claim 1, in which the cover means comprises endless roller chains carrying cover plates.

5. Apparatus according to claim 1, in which the guiding means comprises an angulated plate.

* * * * *